Nov. 10, 1959  J. M. SIMPSON ET AL  2,911,856
AUTOMATIC TRANSMISSION AND CONTROL SYSTEM THEREFOR
Filed July 19, 1941  11 Sheets-Sheet 1

Inventors:
John M. Simpson and
Harold E. Carnagua
By Edward C. Gritzbaugh
Atty.

Nov. 10, 1959  J. M. SIMPSON ET AL  2,911,856
AUTOMATIC TRANSMISSION AND CONTROL SYSTEM THEREFOR
Filed July 19, 1941  11 Sheets-Sheet 4

Inventors
John M. Simpson and
Harold E. Carnagua
By Edward C. Fitzhugh
Atty

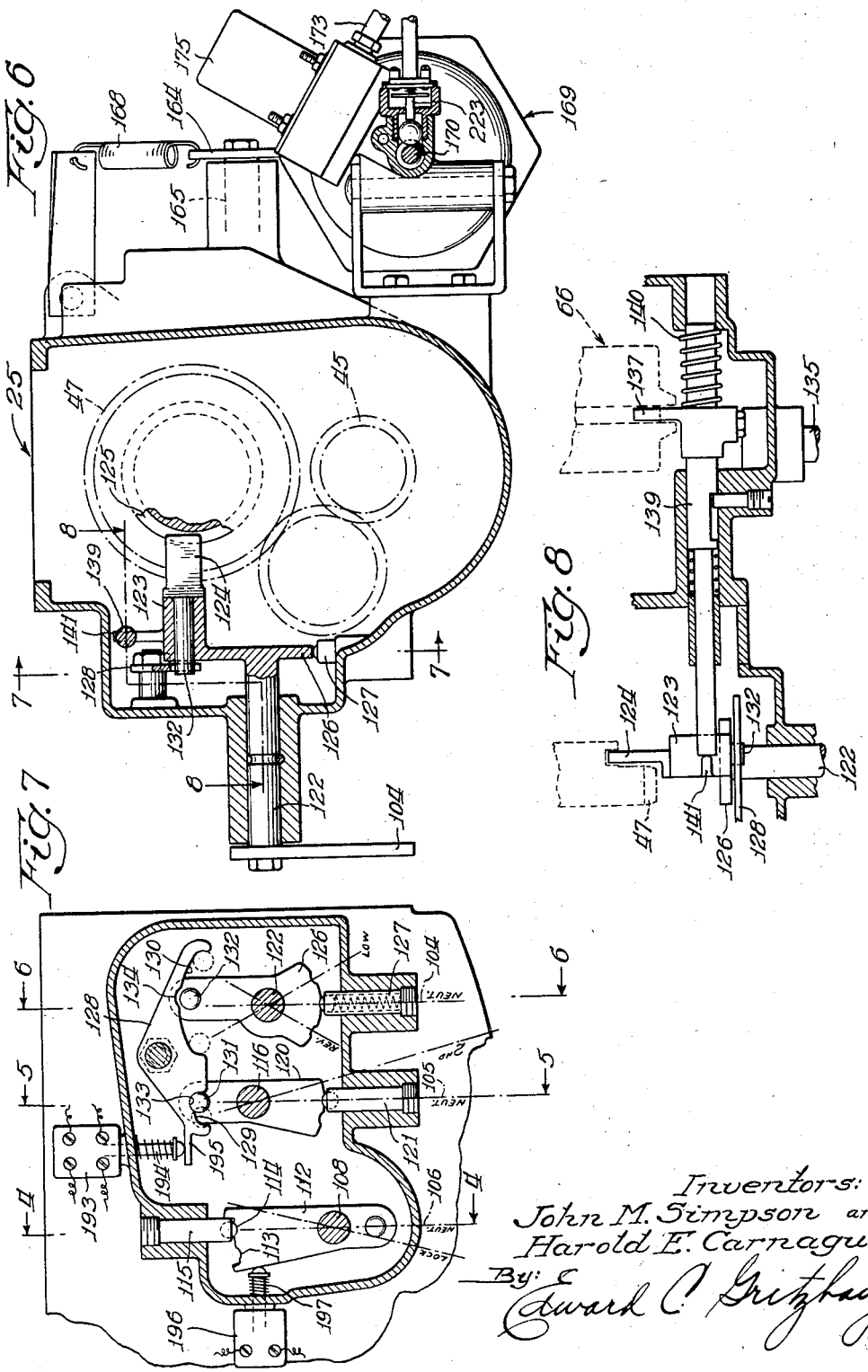

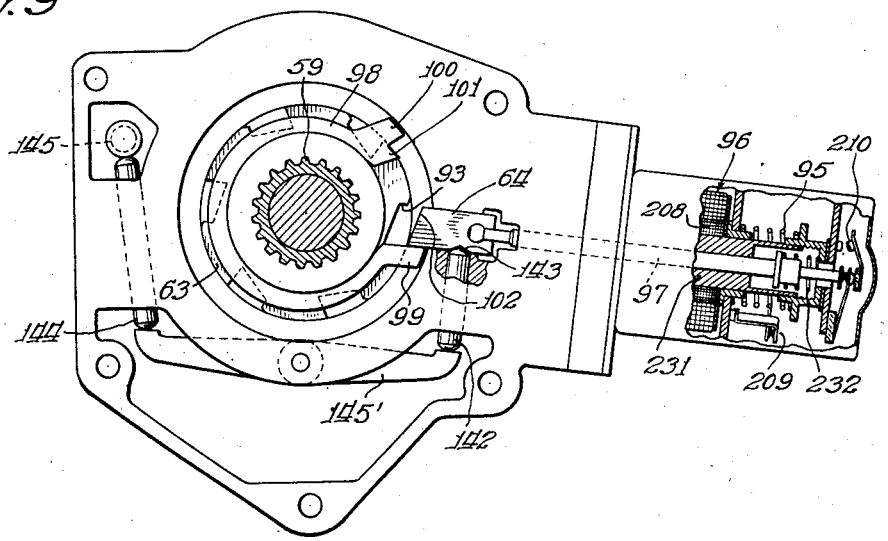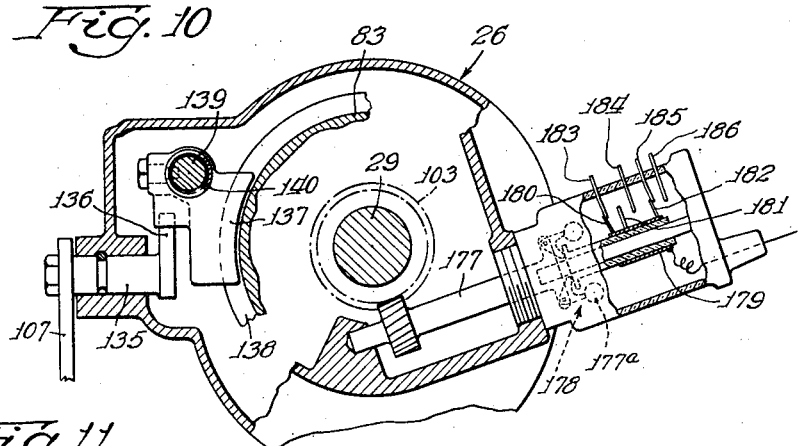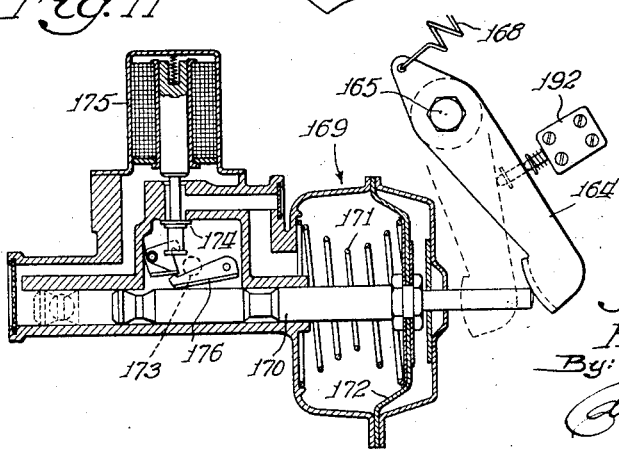

Nov. 10, 1959  J. M. SIMPSON ET AL  2,911,856
AUTOMATIC TRANSMISSION AND CONTROL SYSTEM THEREFOR
Filed July 19, 1941  11 Sheets-Sheet 7

Inventors:
John M. Simpson and
Harold E. Carnagua
By: Edward C. Gritzbaugh
Atty.

Inventors:
John M. Simpson and
Harold E. Carnagua

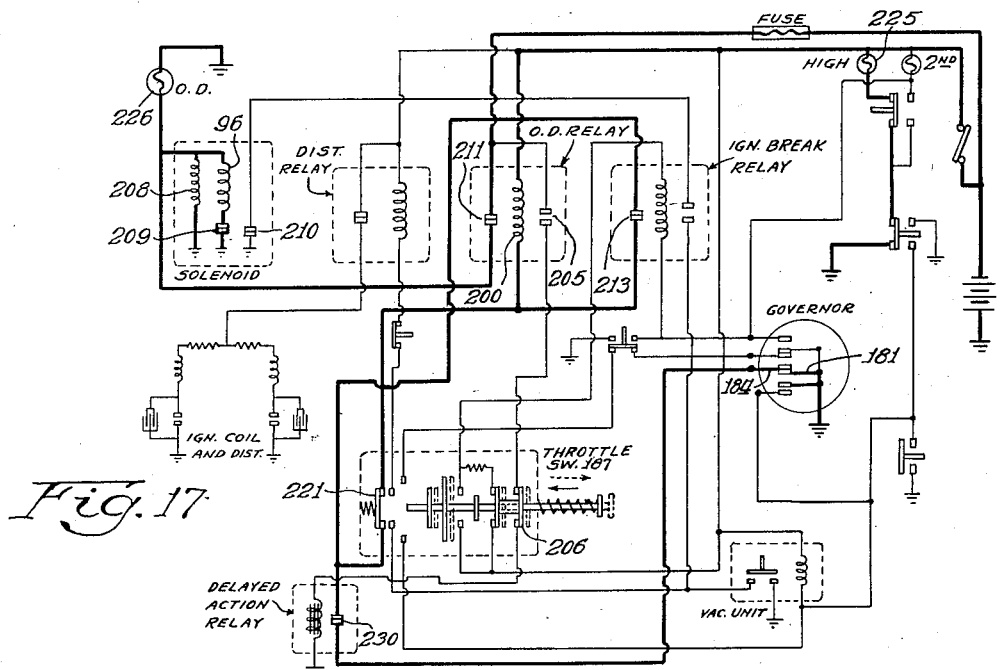
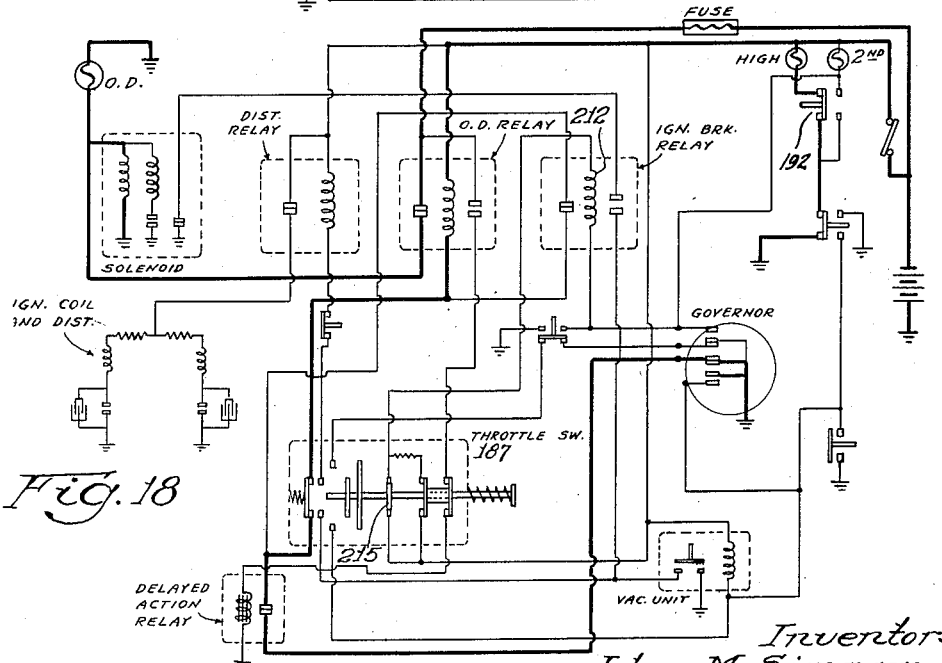

Inventors:
John M. Simpson and
Harold E. Carnagua

2,911,856
AUTOMATIC TRANSMISSION AND CONTROL SYSTEM THEREFOR

John M. Simpson and Harold E. Carnagua, Muncie, Ind., assignors to Borg-Warner Corporation, Chicago, Ill., a corporation of Illinois Application July 19, 1941, Serial No. 403,196

24 Claims. (Cl. 74—740)

This invention relates to automatic transmissions such as may be used in automotive vehicles and is particularly adapted to transmissions comprising a plurality of units in tandem such as for example, a change speed transmission in tandem with a planetary transmission.

An object of this invention is to provide an improved transmission which will produce one manually operated speed ratio and a plurality of automatically operated usable ratios, the ratios being secured by combining two transmission units in tandem.

Another object of this invention is to provide a transmission wherein a countershaft type of unit is combined in tandem with an overdrive type of unit, the overdrive unit being operable to provide usable ratios when combined with two of the ratios obtainable through the countershaft type unit.

Another object of this invention is to provide a control system for a two-unit type of transmission which will produce a manually operated low ratio, a manually operated second speed ratio, an automatically operated overdrive second speed ratio and an automatically operated overdrive direct speed ratio.

Another object of this invention is to provide a two-unit transmission having a plurality of automatically controlled ratios with manual controlled means for overruling the automatic control to produce a down shift through the transmission and which has provision for preventing down shifts, under manual control, to avoid spinning the rear wheels of a vehicle in icy weather.

These and other objects of the invention will become apparent from the following detailed description when taken together with the accompanying drawings in which:

Fig. 2a is an elevation in section of a fluid coupling and friction clutch which is to be connected to the input of the transmission in Fig. 2;

Fig. 3a is a development of the blocker of Fig. 3;

Fig. 6 is a section through the first unit of the transmission taken along lines 6—6 of Fig. 2;

Fig. 7 is a section taken along 7—7 of Fig. 6 showing the interlock mechanism for the first unit of the transmission;

Fig. 8 is a section taken along 8—8 of Fig. 6 showing the lock-up means for the second unit as controlled by a reverse shift of the first unit;

Fig. 9 is an end elevation partly in section through the second unit showing the shift means therefor;

Fig. 10 is an end elevation of the second unit partially in section showing the drive of the governor;

Fig. 11 is a cross-section through the automatic control device for the first unit;

Fig. 12 is a schematic diagram showing the manual controls for the two units; and Figs. 13 to 22 are wiring diagrams showing the connections between the various control elements of the transmissions in the several stages of operation of the transmission.

Figure 1:
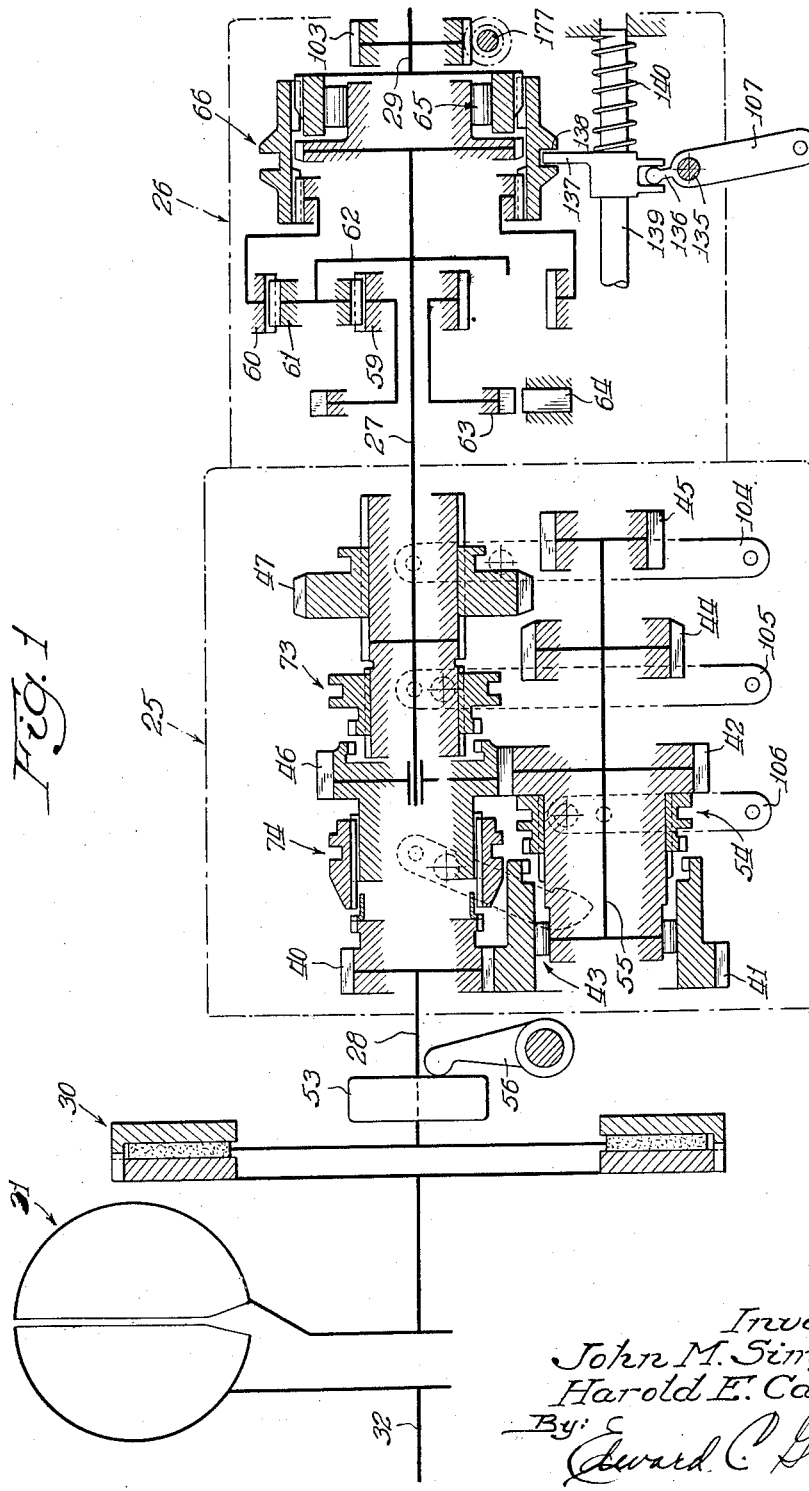
Fig. 1 is a diagrammatic view of the principal mechanical elements of the transmission.

For purposes of illustration this invention will be described with reference to a countershaft type variable speed transmission combined with a planetary type of overdrive transmission such as is disclosed in a co-pending application of Harold E. Carnagua Serial No. 309,718, filed December 18, 1939, the overdrive transmission, however, being modified in one or two important respects to adapt it for operation with the countershaft unit. It is to be understood, however, that the greater portion of the features of this invention may be applied equally as well to two countershaft types of units, or to two planetary types of units, or to two hydraulic torque converting units having lock-up mechanism such as that shown in a co-pending application of J. M. Simpson Serial No. 357,220 filed September 18, 1940, now Patent No. 2,286,585 dated June 16, 1942. Such features may also be applied where either or both units are underdrives and where both units are in the same casing or in different casings, the different casings being joined together or located at different places in the line of drive.

General description

We have found that with a ratio through the differential in the neighborhood of 4.54 it is possible, by means of a combination of countershaft and planetary gearing, to obtain the following overall ratios, the absolute values of the ratios being susceptible of considerable variation and being of less importance than the relative values.

| | |
|---|---|
| 1st speed | 11.7:1 |
| 2nd speed | 8.31:1 |
| Overdrive second | 5.98:1 |
| Direct drive | 4.54:1 |
| Overdrive direct | 3.26:1 |

This combination of ratios is made possibly by combining an overdrive ratio of .722 with a second speed ratio of 1.83. It will be observed that the successive ratios differ from one another by at least 1.25 and that overdrive second differs from overdrive direct numerically by 2.71. Likewise second speed differs from overdrive second by 2.23. Since these ratios are numerically about the same distance apart it is possible to start in second, shift to overdrive second, and then shift to overdrive direct, omitting direct speed, without producing an undesirable sluggish effect upon the operation of the vehicle. When performance is desired at cruising speeds, for example, when it is desired to pass another vehicle, the ratio obtained through overdrive second is too high to produce any acceleration and accordingly direct drive, which is substantially mid-way between overdrive second and overdrive direct, is made available. Similarly if the operator finds himself in heavy traffic where it is substantially impossible to go above say 23 m.p.h., the direct drive ratio is made available instead of overdrive second.

It is contemplated by this invention that suitable gearing be provided to secure the ratios specified and that controls be provided which will enable the operator to shift automatically from second speed either to overdrive second, or to direct, and thence to overdrive direct, the choice of going into overdrive second or into direct, within certain limits, resting with the operator.

Referring to the schematic assembly diagram shown in Fig. 1 for a general description of the mechanical features, the transmission is comprised of a first unit 25 of the countershaft type, a second unit 26 of the planetary type which is connected to the first unit through an intermediate shaft 27; an input shaft 28, an output shaft 29, a disconnectible friction clutch 30 which is driven by a hydraulic coupling 31 from the crank shaft 32 of a prime mover such as an internal combustion engine (not shown). The hydraulic coupling 31 provides an automatic start from rest, and the clutch 30 serves to disconnect the transmission from the coupling to enable the operator to make such manual shifts as are provided by the transmission.

The first unit 25 is comprised of an input gear 40 directly connected to input shaft 28, a gear 41 mounted on a countershaft 55 and in mesh with input gear 40, a second countershaft gear 42 which is driven from gear 41 through an overrunning clutch 43, two progressively smaller countershaft gears 44 and 45, a gear 46 loosely mounted on intermediate shaft 27 and a gear 47 slidably mounted on said intermediate shaft 27. When gear 47 is slid to the right (Fig. 1) it engages an idler gear (not shown) which meshes with gear 45 on the countershaft to produce a reverse drive in intermediate shaft 27. When gear 47 is slid to the left (Fig. 1) it engages gear 44 on the countershaft to produce a low speed forward drive in intermediate shaft 27. A position of gear 47 intermediate gears 44 and 45 disconnects shaft 27 from the remainder of the transmission to produce neutral.

A jaw clutch 73 provides a means for connecting loose gear 46 to intermediate shaft 27, another jaw clutch 74 is used to connect loose gear 46 to input gear 40 and a third jaw clutch 54 serves to lock up overrunning clutch 43.

The second unit 26 is comprised of a sun gear 59, a ring gear 60, and a plurality of planet pinions 61 meshing with sun gear 59 and ring gear 60. Planet pinions 61 are mounted on a carrier 62 which is rotatable with intermediate shaft 27. Sun gear 59 is connected to, and rotatable with, a slotted member 63 which may be held against rotation by a radially slidable pawl 64, the pawl being rotationally fixed with respect to the slotted member 63. Intermediate shaft 27 may be directly connected to output shaft 29 through an overrunning clutch 65. Ring gear 60 is connected to output shaft 29 to provide an overdrive, the connection being effected through a jaw clutch 66. In order to prevent free wheeling between intermediate shaft 27 and output shaft 29, as for example, in reverse drive, or when the engine is to be used as a brake, it is desirable to lock up free wheeling clutch 65. This is accomplished through a second position of clutch 66 by instrumentalities to be described later.

The gear trains which may be established through the transmission are as follows:

Neutral, low and reverse are obtained by properly positioning gear 47 as described above. In reverse, gear 47 is moved to the right (Fig. 1) and the drive is from gear 40 to gear 41, overrunning clutch 43, countershaft 55, gear 45, the reverse idler, gear 47, intermediate shaft 27, clutch 66 (reverse position) to output shaft 29. In low speed, gear 47 is moved to the left (Fig. 1) and the drive is from gear 40 as before through gear 41, overrunning clutch 43, countershaft 55, gear 44, gear 47, intermediate shaft 27 through overrunning clutch 65 (or positive clutch 66) to output shaft 29.

For second speed, gear 47 is moved to its neutral position and jaw clutch 73 is engaged with gear 46. The drive is then from gear 40 through gear 41, overrunning clutch 43, gear 42, gear 46, clutch 73 to intermediate shaft 27. If pawl 64 of the planetary unit 26 is disengaged from slotted reaction member 63 as shown in Fig. 1, intermediate shaft 27 is directly connected with output shaft 29 either through clutch 66 or overrunning clutch 65 and the second speed is solely effective.

For direct drive, clutch 73 remains engaged and clutch 74 is moved to engage gear 40. The drive is then from gear 40 through clutch 74, gear 46, through clutch 73 to intermediate shaft 27, and, as in the case of second speed, if pawl 64 is disengaged from slotted member 63, a direct drive will be effected to output shaft 29 either through jaw clutch 66 or overruning clutch 65.

The ratios establishable through planetary unit 26 are direct drive and overdrive, direct drive being obtained as above. When pawl 64 is engaged with slotted member 63, a reaction will be provided for sun gear 59 and an overdrive ratio will then be effected through planet pinions 61 and ring gear 60. If overdrive is established in unit 26 when second speed is effective in unit 25, an overdrive second speed will be established through the transmission as a whole. Similarly, if overdrive is made effective in unit 26 when unit 25 is conditioned for direct drive operation, the overall ratio will be an overdrive direct.

Thus it is possible to establish neutral, reverse, low, second, direct, overdrive second and overdrive direct speed ratios between input shaft 28 and output shaft 29; reverse, low, second, and direct being obtained when the planetary unit 26 is operated in direct drive and in effect acts as a continuation of output shaft 29. It is contemplated that this transmission will be used in an automobile, and since the performance of an automobile depends to a very large extent upon the ratios obtainable in the transmission and the sequence of operation of the ratios, novel gear combinations and sequences of operation are provided which enable an operator to secure the maximum performance from an automobile engine under all circumstances. These will be described hereinafter.

*Detailed description*

Figure 2:
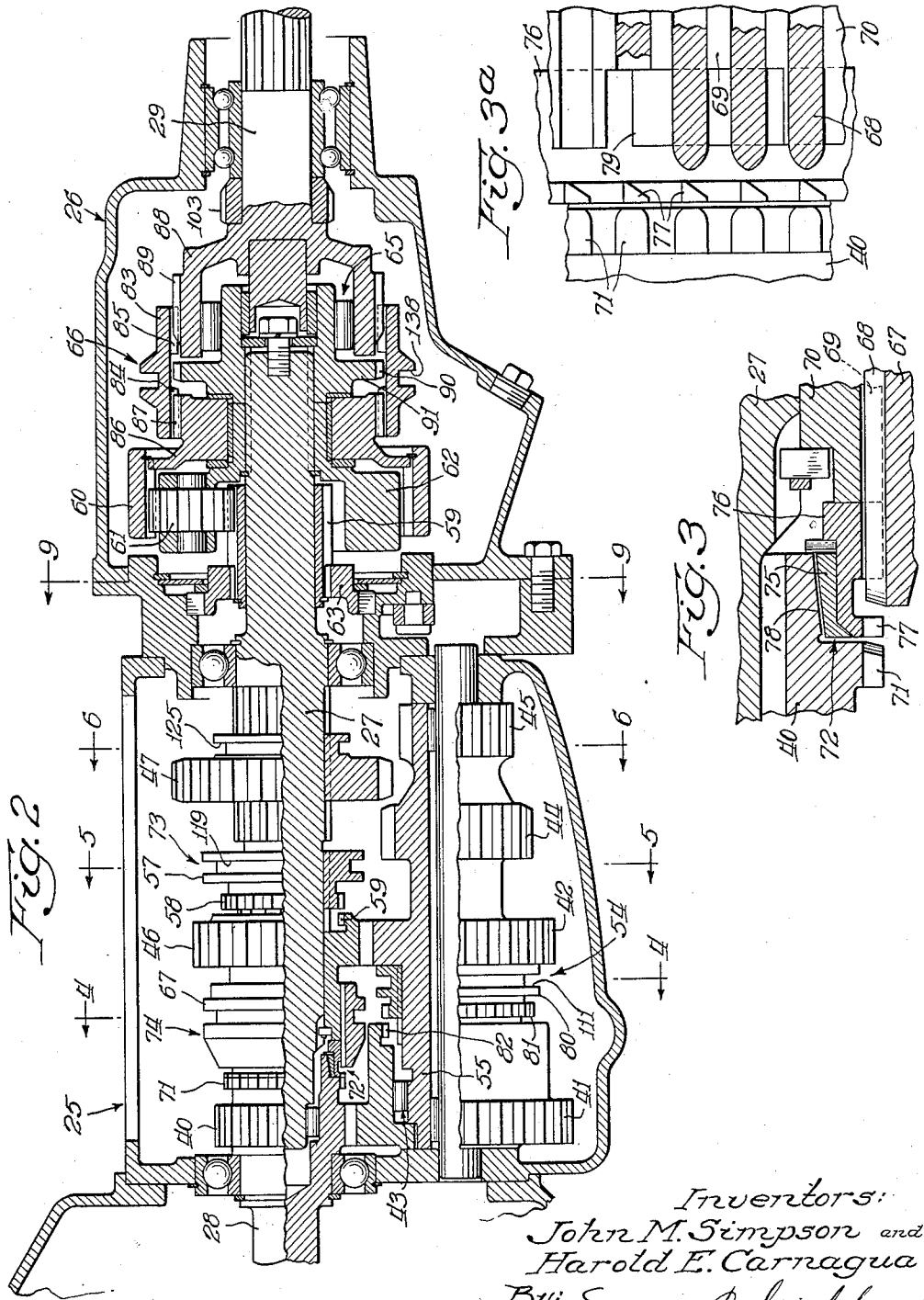
Fig. 2 is an elevation in section in detail of the two units employed in the transmission.

Referring now to Figs. 2 and 2a for a detailed description of the transmission, clutch and coupling, it will be observed that coupling 31 is provided with a housing 33 which is connected for rotation with crankshaft 32. Said housing 33 supports and drives a vaned impeller 34 which in turn drives a vaned runner 35 through the medium of oil or other suitable fluid. Runner 35 drives a short shaft 36 upon which is mounted a flange 37. A suitable oil seal 38 is provided between housing 33 and shaft 36 to prevent a loss of fluid from the housing. A pressure relief valve 39 is provided which removes the possibility of seal 38 functioning to relieve pressure in housing 33.

The clutch comprises the usual clutch housing 48, springs 49 and clutch release levers 50. Said springs 49 bear against a pressure plate 51 which transmits the drive to a friction disc 52 positioned between pressure plate 51 and flange 37. Said friction disc 52 drives input shaft 28, which for purposes of increased rigidity, extends forwardly substantially to crankshaft 32. Release levers 50 are actuated by a clutch release collar 53 which in turn is operated by the usual pedal-controlled clutch release lever 56.

Figure 3:
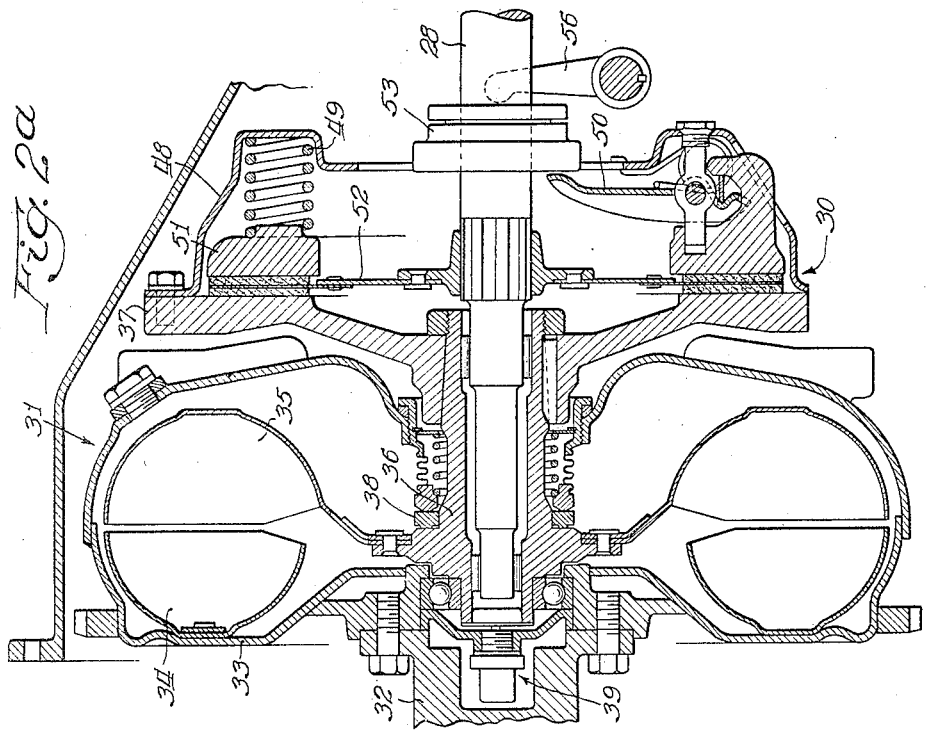
Fig. 3 is an enlarged fragmentary elevation in section taken through a jaw clutch and a blocker used in one of the units of the transmission.

Considering now the details of the countershaft unit 25, jaw clutch 73 is comprised of a collar 57 which is slidably splined on intermediate shaft 27. Collar 57 is provided with external teeth 58 which are engageable with internal teeth 59 on gear 46. Jaw clutch 74 is comprised of a slidable sleeve 67 which is provided with internal teeth 68 (Fig. 3). Said internal teeth 68 engage external teeth 69 on a hub 70 which is integral with gear 46. Input gear 40 is provided with external teeth 71 which may be engaged by sleeve 67 when the latter is moved to the left (Figs. 2 and 3). Between hub 70 and teeth 71 is a blocker 72 the details of which are shown in Figs. 3 and 3a. The blocker 72 is comprised of a conical friction element 75 which is rotatable with a blocking ring 76, the latter having external teeth 77 which are adapted to be interposed in the path of movement of teeth 68 of sleeve 67. Conical friction element 75 is engageable with a complementary conical surface 78 on gear 40 such that when so engaged the blocker 72 will tend to rotate with gear 40. Ring 76 is provided with a lost motion connection 79 which permits the ring to have a small oscillatory movement with respect to sleeve 67. Thus when sleeve 67 is moved toward engagement with input gear 40, the engaging pressure forces blocker ring 76 toward gear 40 to engage friction element 75 with the complementary element 78 on gear 40. The friction between these two elements drags the ring to the limit of its oscillatory movement in the direction of drive and when so moved, teeth 77 are interposed in front of teeth 68 and hence block further movement of sleeve 67. This condition obtains long as gear 40 is the driving member. If, however, torque is removed from gear 40 so as to tend to slow it down relative to sleeve 67, it will tend to move in the opposite direction with respect to sleeve 67 and will move with it ring 76. When this happens, teeth 77 are moved out of the way of teeth 68 and the sleeve 67 may pass through into engagement with teeth 71 on input gear 40.

It is important to note at this point that engagement of jaw clutch 74 cannot take place until there is a relative reversal of torque between gear 40 and gear 46, and that a definite period of time must elapse before such a torque reversal is effected and the clutch engaged. This time interval is approximately one and one-half seconds in the transmission shown and is utilized as the basis for selectively obtaining overdrive second speed before overdrive direct speed.

Lock-up clutch 54 is comprised of a collar 80 which is slidably splined on countershaft 55 and rotatable with it. Said collar 80 is provided with external teeth 81 which may be engaged with internal teeth 82 on countershaft gear 41. When so engaged, a direct connection is provided between gear 41 and countershaft 55 and hence overrunning clutch 43 is locked up to secure a two-way drive between gear 41 and countershaft 55.

The details of the overdrive unit 26 are shown in Figs. 2 and 9. Referring now to these two figures, clutch 66 is comprised of a slidable sleeve 83 having two sets of internal teeth 84 and 85. Ring gear 60 is rotatable with a support 86 which is provided with external teeth 87 engageable with internal teeth 84 of sleeve 83. Output shaft 29 is provided with an enlarged inner portion 88 having external teeth 89 engageable with internal teeth 85. Thus when clutch 66 is in the position shown, a direct connection is effective between ring gear 60 and output shaft 29.

In the space between internal teeth 84 and 85 are located external teeth 90 formed on the periphery of a hub member 91 which is splined to, and rotatable with, intermediate shaft 27. When sleeve 83 is moved to the right (Fig. 2) so as to engage teeth 84 with teeth 90, teeth 85 remaining engaged with teeth 89 on output shaft 29, a direct two-way connection is established between intermediate shaft 27 and output shaft 28 thereby locking up overrunning clutch 65. When such two-way connection is effective, the planetary gears are rotated as a unit and overdrive is impossible.

The shift means for effectuating overdrive is shown more clearly on Fig. 9. It is comprised of a disc 63 which is rotatable with the sun gear 59, the disc being provided with a plurality of radially extending slots 93. The radially movable pawl 64, which is rotationally fixed with respect to sun gear 59 is adapted to engage one of the slots 93 of disc 63 to arrest the rotation of said disc and thereby supply a fixed reaction for sun gear 59. The radial movement of pawl 64 is effected in an outward direction by means of a spring 95, and in a radially inward direction by an automatically controlled device 96, a rod 97 serving to connect the pawl 64 with a spring and automatic device 96.

In addition to the automatic and spring devices for controlling the radial movement of pawl 64, a balk ring 98 is provided, said ring bearing frictionally against disc 63 or some member associated with disc 63 so as to be rotatable therewith. Rotational movement of balk ring 98 however, is limited by a pair of lugs 99 and 100 which are adapted to engage the sides of pawl 64. Lugs 99 and 100 are so spaced as to allow ring 98 to oscillate through substantially 45°. When ring 98 is in the position shown in Fig. 9, pawl 64 may move freely radially inward to engage a slot 93. When ring 98 is oscillated to a position such that lug 100 engages the side of pawl 64, radially inward movement of the pawl is obstructed by an extension 101 which protrudes from lug 100 into the path of movement of the pawl. Thus if pawl 64 is urged inward while the direction of rotation of sun gear 59 is clockwise as shown in Fig. 9, engagement with slot 93 is prevented until a reversal of rotation of the sun gear takes place. If on the other hand pawl 64 is urged inward while the direction of rotation of the sun gear is counterclockwise, no obstruction is interposed in the path of the pawl and the latter may engage a slot 93 promptly and arrest the rotation of sun gear 59. It will be noted from Fig. 2 that the counter-clockwise rotation of the sun gear occurs during forward drive through overdrive unit 26, which is the direction of drive when a shift is to be effected from either second speed or direct drive to overdrive second or overdrive direct. It is contemplated by this invention that the engagement of pawl 64 with its slot 93 will be much more rapid than the engagement of jaw clutch 74 with input gear 40 for the establishment of direct drive through countershaft unit 25. It will be observed that since jaw clutch 74 is dependent upon a reversal of torque for its operation and pawl 64 is not so dependent, the latter is inherently faster in operation than the former.

In order to assist pawl 64 in engaging a slot 93, the end 102 of the pawl is chamfered as shown on Fig. 9. The direction of the chamfer is opposite to that normally used in planetary overdrives of this type since the pawl is not dependent upon torque reversal under ordinary circumstances for its engagement. However, due to the characteristics of a planetary gear set arranged as shown in Fig. 2, the sun gear may at some time begin to rotate reversely with respect to intermediate shaft 27 although the latter may still be rotating in a counter-clockwise direction. If the pawl were urged inwardly at such time, the chamfered edge 102 would cause the pawl to ratchet over the slots 93, and it is to prevent such ratcheting that obstruction 101 is provided on lug 100.

A speedometer drive gear 103 (Figs. 2 and 10) is mounted on output shaft 29 and is rotatable therewith. In addition to driving the speedometer said gear 103 also drives a governor which will be described later.

The manual controls

Certain ones of the slidable and shiftable elements of the transmission described above are controlled through individual levers which may be moved manually by means of external controls. Referring to Fig. 1, the friction clutch 30, as stated above, is controlled by the usual clutch pedal (not shown). Sliding gear 47 is controlled by a lever 104, jaw clutch 73 is controlled by a lever 105, second speed lock-up clutch 54 is controlled by a lever 106, and overdrive lock-up clutch 66 is controlled by a lever 107. It will be observed from Figs. 1 to 3 inclusive and Fig. 8 that gear 47 is moved to a reverse position by pulling the free end of lever 104 to the left (Fig. 1), neutral position is obtained when the lever is substantially vertical and low speed position is obtained when the lever is moved backward. Jaw clutch 73 is engaged with gear 46 by a backward movement (to the right in Fig. 1) of the free end of lever 105 and is disengaged when the lever is substantially vertical. Lock-up clutch 54 is engaged when the free end of lever 106 is moved forward (to the left in Fig. 1) and disengaged when the lever is in a substantially vertical position. Overdrive lock-up clutch 66 is engaged when the free end of lever 107 is moved forward and is disengaged when the lever is in a substantially vertical position.

Figure 4:
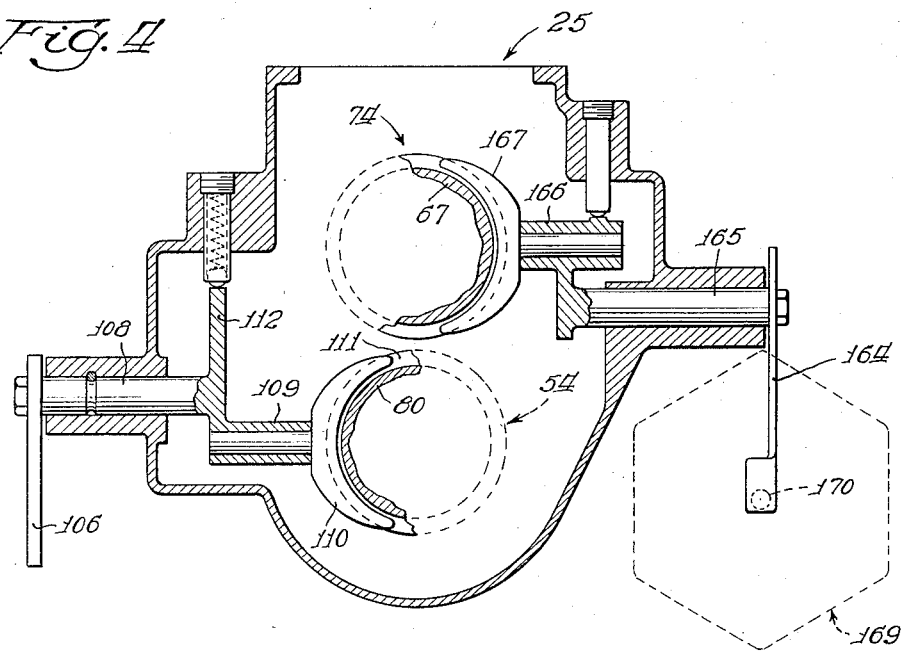
Fig. 4 is a section through the first unit of the transmission taken along lines 4—4 of Fig. 2.

Referring specifically to Figs. 4 and 7, lever 106 is shown connected to a rock shaft 108 on the inner end of which is a crank 109. A yoke 110 is pivoted in crank 109 and engages a groove 111 in slidable sleeve 80 of jaw clutch 54. Opposite crank 109 is a plate 112 which has two recesses 113 and 114 which are engageable by a poppet 115. The poppet serves to locate the lock-up clutch in one or the other of its extreme positions.

Figure 5:
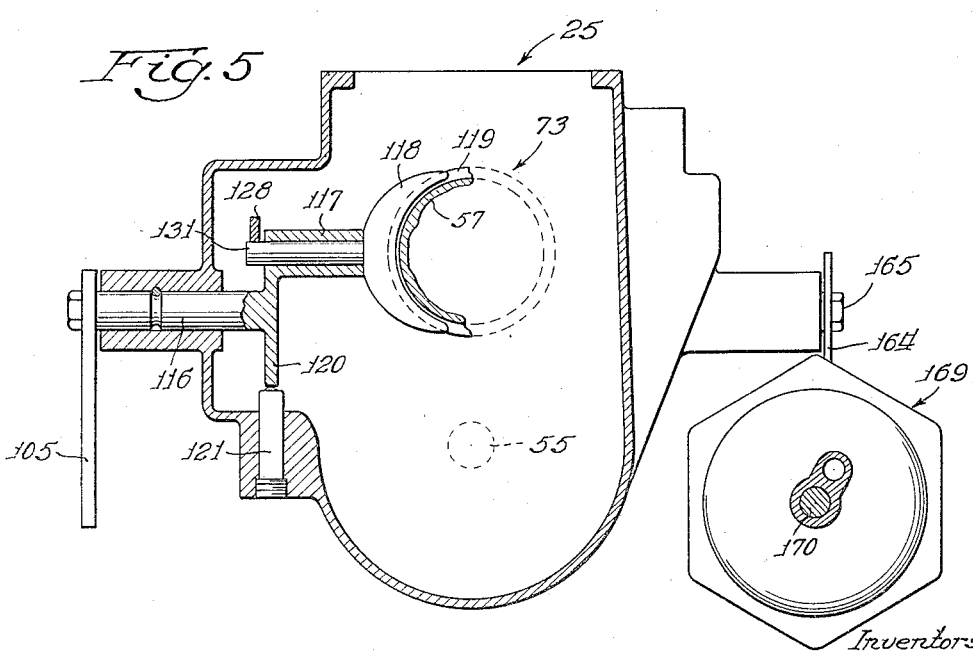
Fig. 5 is a section through the first unit of the transmission taken along lines 5—5 of Fig. 2.

Lever 105 (Figs. 5 and 7) is connected to a rock shaft 116 and is provided with a crank arm 117 in which is pivotally mounted a yoke 118 engageable with a groove 119 in slidable collar 57 of jaw clutch 73. Opposite crank 117 is a plate 120 which cooperates with a poppet 121 to locate the two extreme positions of clutch 73.

Referring to Fig. 6, lever 104 is connected to a rock shaft 122 which is provided with a crank 123 in which is pivoted a blade 124 which engages a groove 125 in gear 47. Opposite crank 123 is a plate 126 which cooperates with a poppet 127 locating the three positions of this lever.

In order to prevent the countershaft unit 25 from being shifted into two ratios simultaneously, the interlock mechanism shown in Fig. 7 is employed. This mechanism comprises a walking beam 128 which is pivoted to the casing and is provided with two spaced curved notches 129 and 130, the latter being of substantially greater extent than the former. Pivoted yoke 118 which controls jaw clutch 73 extends through the crank 117 in the form of a pin 131, and pivoted blade 124 likewise extends through crank 123 in the form of a pin 132, pins 131 and 132 extending to the noches 129 and 130. Each notch 129 and 130 is provided with a recess 133 and 134, respectively, to receive pins 131 and 132, respectively, the recesses and notches being so arranged that when pin 131 is in engagement with its recess, pin 132 is free to move along notch 130, and vice versa but both pins cannot be simultaneously moved along their respective notches.

Referring to Figs. 6, 8, 9 and 10 now for a detailed description of the control for overdrive lock-up clutch 66, it will be observed that lever 107 is connected to a rock shaft 135 which is provided with a crank 136. Said crank engages a yoke 137 which engages a groove 138 in slidable sleeve 83 of the clutch. Said yoke 137 is mounted upon a rod 139 which is normally biased by spring 140 to the left (Fig. 8) which corresponds to released position of clutch 66. Said rod 139 extends forwardly into unit 25 and engages an abutment 141 on crank 123, which, as stated before, controls the forward and reverse gear 47. Thus when lever 104 is pulled forward to shift gear 47 into reverse position, abutment 141 will simultaneously shift rod 139 backward against the action of spring 140 and thereby move sleeve 83 of clutch 66 backward to lock-up position.

An interlock is provided between pawl 64 and clutch 66 so that it would be impossible to shift unit 26 simultaneously into overdrive and lock-up direct drive. The interlock comprises a push rod 142 adapted to engage a notch 143 in pawl 64, another push rod 144 adapted to engage a notch 145 in rod 139, and a walking beam 145' which engages the ends of push rods 142 and 144. The notches, push rods and walking beam are so arranged that when control rod 139 is moved to shift clutch 66 to lock-up position push rod 142 will engage notch 143 and prevent a radial movement of pawl 64, and similarly, when pawl 64 is moved radially inward, push rod 144 engages notch 145 and prevents axial movement of rod 139 to engage clutch 66.

The external controls for the various levers and the connections thereto are shown in Fig. 12. The principal external control comprises a hand lever 146 located preferably beneath the steering wheel of the vehicle, said lever being rotatably retained in a support 147. A rod 148 connects lever 146 to a second lever 149 located under the floor of the vehicle. A preferred control motion for lever 146 is that shown in outline at 150 wherein neutral is obtained by positioning the lever 146 in substantially the middle of its travel, reverse is obtained by raising the end of the lever and pushing it counter-clockwise with respect to the steering wheel, low speed is secured by raising lever 146 and pulling clockwise to the position shown dotted, forward is obtained by pushing downward on the lever when it is in neutral and then pulling forward to the dotted position marked "Forward" and the lock-up clutch 54 is operated by pushing downward on the end of lever 146 when it is in forward position and then rotating it counter-clockwise to the dotted position marked "2nd speed lock-up."

The movement of lever 146 to reverse position is transmitted to reverse shift lever 104 through a rail 151 and a rod 152, rail 151 being provided with a notch 153 which is engageable by the end of lever 149. Neutral and low are obtained through the movement of the same instrumentalities. Forward speed, which corresponds to second speed and requires that clutch 73 be engaged with gear 46, is obtained through a shift rail 154 and a rod 155, connected to forward speed lever 105, said rail 154 being provided with a notch 156 which is engageable by the end of lever 149 when the latter has been positioned in neutral. The double shift for second speed lock-up is transmitted to levers 106 and 107, which control respectively the second speed and overdrive lock-up clutches, by means of a third shift rail 157 and a rod 158 which passes through an apertured lug 159 to a lost motion connection 107a on lever 107. Shift rail 157 is likewise provided with a notch 160 which is engageable by the end of lever 149 when the latter has been moved to forward position and then pushed downward. An interlocked mechanism 161 of any suitable character may be employed between rails 154 and 157 to maintain one rail in place while the other is moving thereby to prevent disengagement of clutch 73 which when disengaged would destroy the drive through second speed.

For a push start, wherein the engine is started by pushing the vehicle, it is desirable to use direct drive through the transmission. This requires that lock-up clutch 66 of the overdrive unit 26 be operated independently of the second speed lock-up clutch 54. This is accomplished through the lost motion connection 107a on lever 107 and by providing a separate Bowden wire control 162 with a button 163 on the dash, the connection between the Bowden wire 162 and lever 107 likewise being a lost motion connection.

The automatic controls

The manual controls just described are effective only to second speed and all speeds above second are secured automatically. Since the transmission can be operated from a standing start in second speed, movement of hand lever 146 to second speed position is equivalent to conditioning the transmission for forward drive. The automatic controls for securing speeds above second are as follows, reference being made to Figs. 4, 6, 9, 10 and 11:

The control for jaw clutch 74, which controls the shift from second speed to direct drive and back again comprises an arm 164 which is connected to a rock shaft 165, the latter being provided with a crank arm 166 in which is pivotally mounted a yoke 167 which engages sleeve 67 of clutch 74. A spring 168 normally biases arm 164 in a clockwise direction (Fig. 11) to engage clutch 74 for direct drive. The action of spring 168 is opposed by an electrically controlled vacuum operated device 169 which is shown in Figs. 6 and 11. This device is comprised of a rod 170 which is urged by a spring 171 in a direction to oppose spring 168, thus to shift jaw clutch 74 to second speed, spring 171 being stronger than spring 168. The action of spring 171 is in turn opposed by a pressure differential operated diaphragm 172, one side of which is adapted to be connected to a vacuum line 173 through a valve 174. The movement of the valve is in turn controlled by a solenoid 175 in a manner hereinafter to be described. When the rod has once been moved by the pressure differential device it is latched in position by means of a latch 176 which thereafter renders the rod independent of fluctuations of vacuum.

Associated with vacuum unit solenoid 175 is an ignition interrupting switch 223 which is shown in detail in Fig. 6. It is actuated by movement of rod 170 so as to break the circuit to the ignition just prior to the engagement of the rod with direct-second lever 164 and then, as the lever is moved to disengage clutch 74, the ignition circuit is again restored.

The automatic control for the overdrive unit is shown in Fig. 9 and comprises a solenoid 96 provided with a holding coil 208 which when energized pushes pawl rod 97 radially inward by means of an armature 231 and spring 232 acting upon rod 97. A switch 209 is operated by movement of rod 97 to break the circuit through solenoid 96 when pawl 64 is engaged with its slot 93, and a switch 210 is likewise operated by movement of pawl rod 97 to close a conditioning circuit for a down shift.

The shifts above second speed are made automatically but under the control of the operator to produce direct drive at speeds ranging from approximately 12 m.p.h. to 23 m.p.h., overdrive second or overdrive direct at the operator's option at speed ranging from approximately 23 m.p.h. to approximately 35 m.p.h., and overdrive direct at speeds above 35 m.p.h. It is also contemplated that down shifts will be made automatically under the control of the operator from overdrive direct to direct drive at speeds above 35 m.p.h., and from overdrive direct to overdrive second and immediately thereafter at the option of the operator to second speed at speeds ranging from 35 m.p.h. to 23 m.p.h. and a further down shift from direct to second at speeds ranging from 23 m.p.h. to 12 m.p.h. These combinations of speeds are controlled primarily by the joint action of a speed controlled switch or governor 178 (Fig. 10) and a throttle controlled switch 187 (Fig. 12). Other switches are provided which operate in conjunction with certain of the shift levers, or are manually controlled, to further modify the joint controlling action produced by the governor and throttle switch.

The governor switch is shown schematically in Fig. 10 and comprises a shaft 177 which is driven from speedometer drive gear 163 and output shaft 29 so as to be responsive to the speed of the output shaft. Obviously the governor could be driven from some other shaft or part which is movable with the vehicle. Shaft 177 drives one or more weights 177a which are pivoted to the shaft and are adapted to swing outwardly when shaft 177 is rotated. Weights 177a move a rod 179 to which are secured a plurality of switch arms 180, 181 and 182. Said switch arms cooperate with fixed contacts 183, 184, 185 and 186 to effect changes in the electrical circuit to the overdrive solenoid 96 and second-and-direct speed control solenoid 175 which will produce low speed up to 12 m.p.h., direct drive up to 23 m.p.h., overdrive above 23 m.p.h., downshift to second below 35 m.p.h., and downshift to direct only above 35 m.p.h. respectively. Obviously the speeds at which changes in function are obtained may be varied within wide limits to suit the particular characteristics of the vehicle and the desires of the operator.

The throttle switch 187 is shown in Fig. 12 and comprises a plurality of individual switches operated by a rod 189 which may be pushed inwardly against the action of a spring 190 by the accelerator pedal 191. The contacts are arranged to be operated at three critical positions of the accelerator pedal, namely, (1) substantially closed position, (2) substantially one-half open position, and (3) substantially fully opened position. The last named position is the downshift position for both transmission units and the other two positions are conditioning positions for the downshifts.

A direct-second switch is provided which is controlled by the lever 164 for operating direct-second jaw clutch 74. This switch is shown in Fig. 11 at 192 and controls the down shift into second speed from overdrive direct speed. The switch compels a sequence of downshifts from overdrive direct to overdrive second and then to second speed instead of a conventional and less desirable sequence comprising a shift from overdrive direct to direct and then to second speed.

A forward-and-reverse interlock switch is provided which renders an automatic shift into direct impossible when the transmission has been manually shifted to low, neutral or reverse positions. This switch is shown in Fig. 7 at 193 and is comprised of a rod 194 which engages an extension 195 on walking beam 128 of the interlock mechanism so as to be controlled by movement thereof.

A third switch is provided which likewise prevents a shift into direct drive, this switch being operated in conjunction with the second speed and overdrive lock-up clutches 54 and 66. It is shown in Fig. 7 at 196 and comprises a rod 197 which cooperates with plate 112 in such a manner that when the transmission is conditioned for lockup, the switch will prevent the operation of jaw clutch 74 to produce direct drive as aforesaid.

The electrical controls also include various relays which cooperate with the overdrive and second speed-and-direct drive controls and with the governor and other switches to control the operation thereof all as will be hereinafter described in detail. These relays may be mentioned here briefly as an overdrive relay, an ignition break relay, a distributor relay, and a delayed action relay.

The circuit diagrams

Figure 13:
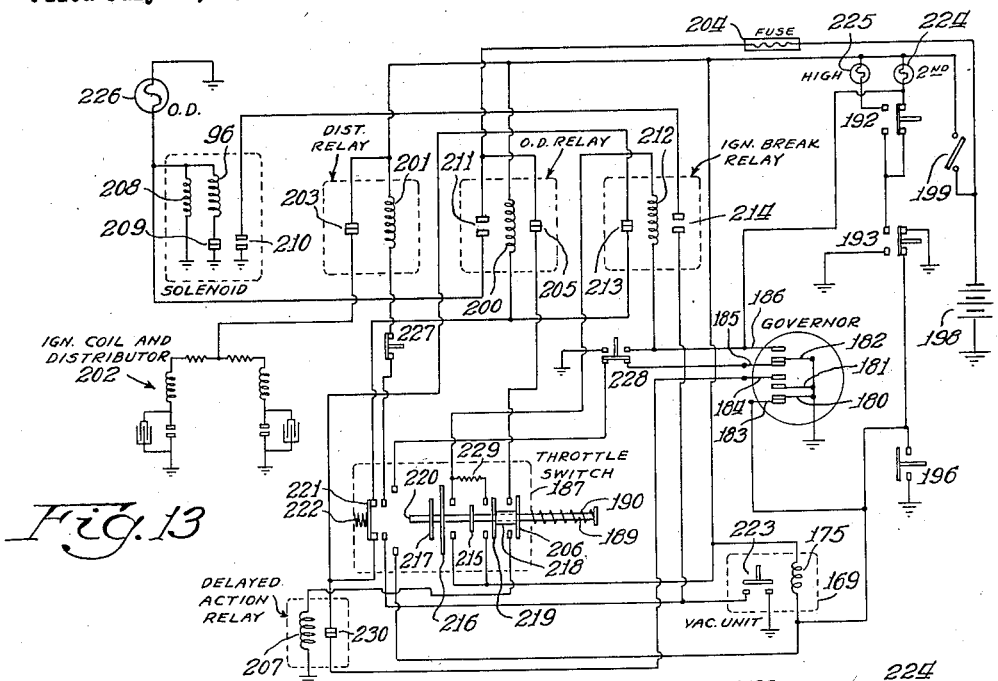

The connections between the electrical elements which cooperate to provide the necessary functions for the transmission are shown in Fig. 13. These comprise, among others, a power circuit from a battery 198 through an ignition switch 199 to solenoid 175 (hereinafter termed "vacuum unit") which it will be remembered controls the shift from second to direct; another power circuit to the overdrive relay 200, a third power circuit to the distributor relay 201, and a fourth power circuit to the ignition system 202 through the normally closed contacts 203 of distributor relay 201. The ignition system illustrated is of the variety used on multiple cylinder engines of the V-type. It is to be understood that the wiring diagram is applicable equally as well to ignition systems used on other types of engines.

Another power circuit is established from battery 198 through a fuse 204, and normally closed contacts 205 of overdrive relay 200 to the throttle switch 187. Said throttle switch 187 is provided with a switch 206 which when operated completes the power circuit to delayed action relay 207. The direct-second switch 192, the reverse, neutral, low and forward switch 193 and the lock-up switch 196 are shown schematically in Fig. 13 at the right hand side of the figure. In the upper left hand corner of Fig. 13 are shown the overdrive solenoid 96, holding coil 208, solenoid release switch 209, and ignition break control switch 210. The overdrive relay is provided with a second pair of contacts 211 which control the energization of overdrive solenoid 96. The ignition break relay comprises a coil 212 and two sets of contacts 213 and 214, the contacts 213 controlling one of the paths for the energization of overdrive relay 200 and the other set 214 controlling the ignition break circuit.

Throttle switch 187, as stated previously, is comprised of a rod 189 to which are secured switch arms 215, 216 and 217. Switch 206 is mounted on a collar 218 which is slidable on rod 189 and to which is secured a switch arm 219 so as to be movable with switch 206. The end 220 of rod 189 operates a switch 221 which is normally made by means of a spring 222 operating in opposition to rod 189. Switch 206 controls a circuit through delayed action relay 207. Switch 219 controls the holding circuit through ignition break relay coil 212. Switch 215 controls the energization of the coil 212. Switch 216 controls the down shift in the vacuum unit, switch 217 establishes the circuit through distributor relay coil 201 to interrupt the ignition circuit and switch 221 controls the second path for energizing overdrive relay coil 200.

Provision is also made in the electrical circuit for indicator lights to indicate the ratio which is operative at any instant. Thus a second speed light 224, a high speed light 225, and an overdrive light 226 are provided all of which are shown at the top of Fig. 13.

Two other controls are shown in Fig. 13, namely, switch 227 and switch 228. These switches may be termed the "Icy Weather Control" and serve to prevent a down-shift into direct drive and into second speed, respectively.

In Fig. 13 all of the elements are shown in the condition which obtains before the ignition switch 199 is turned on and while the car is standing still in neutral. It will be recalled that when in neutral, low or reverse, switch 193 is moved to render impossible a shift into direct. This is accomplished by providing a ground through the switch for vacuum unit solenoid 175 so that when ignition switch 199 is turned on to complete the circuit through the solenoid, the solenoid will remain operated thereafter and will not permit a shift into direct drive. Similarly, when the transmission is shifted to second speed wherein switch 193 is moved to the left (Fig. 13) to remove ground from solenoid 175, a shift into direct by the governor may still be rendered impossible by means of lock-up switch 196 which operates in conjunction with lock-up clutches 54 and 66. It will be observed that switch 196 supplies the ground to solenoid 175 which was removed when switch 193 was shifted to the second speed position, that is, to the left.

Having described the general function of the various elements of the circuit, the cooperation between the various elements under nine selected conditions possible in the transmission will now be detailed.

Figure 14:
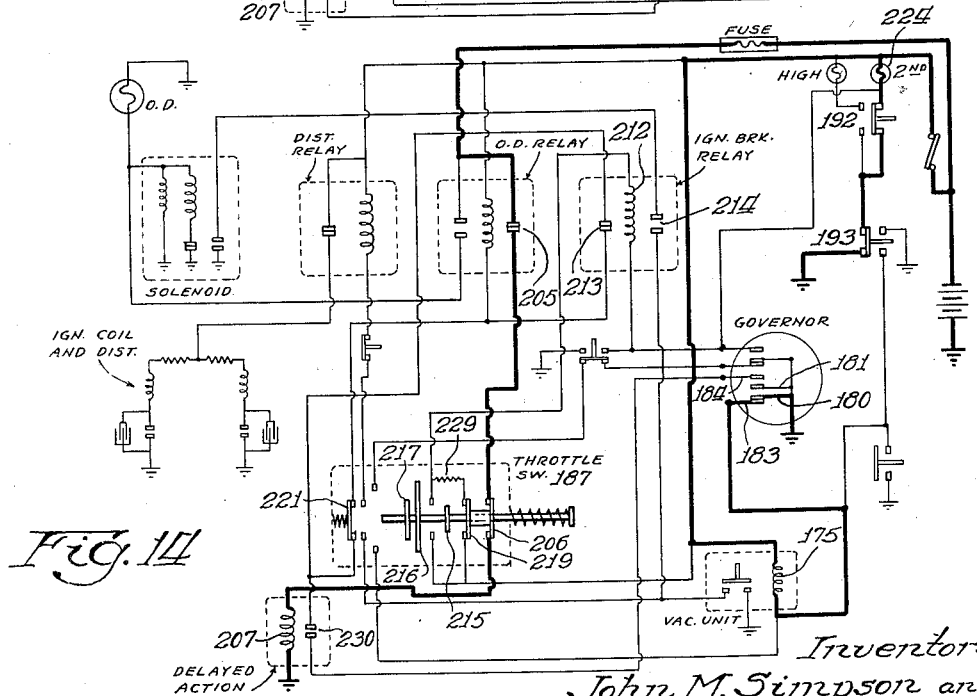

(1) *Ignition on, vehicle moving less than 12 m.p.h.*—Fig. 14 shows the condition of the circuit when the ignition has been turned on and the car is moving at a speed less than 12 m.p.h., which is the critical speed for the first operation of the governor switch. It will be assumed in this condition and in the subsequent conditions that the manual control lever at the steering column has been moved to shift the transmission into forward speed which as we have seen previously is in reality the position for second speed through the first unit 25. Switch 193 is therefore in its left hand position (Fig. 14), which puts ground on one side of direct-second switch 192. When the ignition switch is turned on a circuit is completed through the second speed light 224 thereby indicating to the operator that the transmission is conditioned for second speed operation. At the time the ignition circuit was turned on a second circuit was completed through solenoid 175 of the vacuum unit and contact 183 and the switch arm 180 of the governor, which operated the pressure differential device in the vacuum unit to allow spring 171 to shift jaw clutch 74 to second speed position, that is, to disconnect input gear 40 from gear 46. Upon depressing the throttle to start the car moving, switch 206 of throttle switch 187 completed a circuit to delayed action relay 207 through contacts 205 of overdrive relay. The battery was also connected to one of the contacts operated by each of the switches 215 and 219. Switch 219 was, of course, operated with switch 206 and completed a circuit through a resistance 229, coil 212 of ignition break relay and switches 192 and 193 to ground. The ignition break relay did not operate, however, since resistance 229 did not permit sufficient current to pass through coil 212 for this purpose. Delayed action relay 207 was also operated but did not effect any change in the remainder of the circuit since the circuit controlled by contacts 230 of the relay is still open through the governor contact 184 and arm 181.

During the normal operation of the throttle, any of the remaining switches 215, 216, 217 and 221 operated by throttle switch 187 may be operated, but it will be observed that as long as the circuit through the governor switch 180 and contact 183 is completed and the remaining circuits through the governor are as shown, no change will be effected in the operation of the transmission. Thus although movement of the throttle switch 187 to a position corresponding to one-half throttle will cause switch 216 to complete the circuit through the ignition break relay coil 212 and operates the relay, the contacts 213 and 214 controlled by the ignition break relay affect circuits which are broken elsewhere and cannot be completed until some other instrumentality operates.

Figure 15:
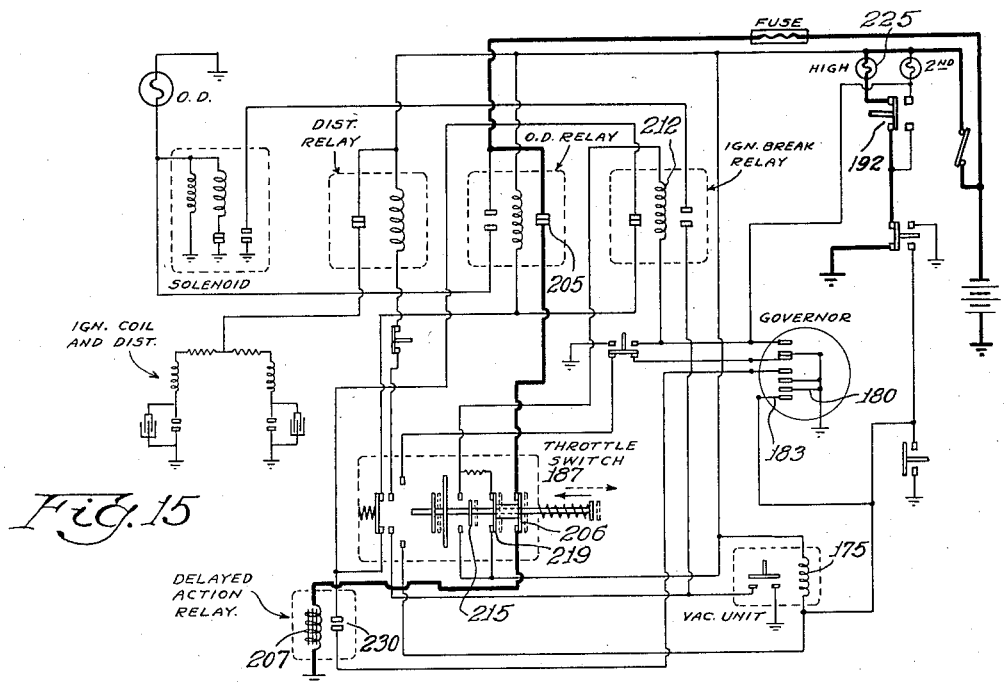

(2) *Vehicle moving between 12 m.p.h. and 23 m.p.h.*—Fig. 15 shows the changes which will be effected in the circuit when the vehicle moves at a speed included in the range between 12 m.p.h. and 23 m.p.h. Assuming that the throttle switch 187 is in the position shown solid, it will be observed that the circuit through delayed action relay 207 is again completed through overdrive relay contacts 205 and switch 206. Contacts 230 therefore are open as shown in solid lines. Upon reaching 12 m.p.h. however, the governor switch has shifted so as to break the connection between switch arm 180 and contact 183, thereby removing ground from the vacuum unit solenoid 175 and deenergizing this solenoid. As long as torque is applied to clutch 74, however, the clutch will not release and therefore as long as throttle switch 187 is in the position shown solid no shift to direct will be effected.

To complete the shift, torque is removed from direct-second clutch 74 by releasing the throttle, which likewise releases switch 206. When the torque has been relieved for a time which is sufficient to permit blocker 72 to move out of the way, jaw clutch 74 will be operated by spring 168 to effect direct drive through the transmission. The throttle may then be again operated to accelerate the vehicle and delayed action relay 207, which was deenergized when the throttle was released, will again be energized. The operation of jaw clutch 74 to provide direct drive likewise operates direct-second speed switch 192 to remove ground from the ignition break relay coil 212 and the switch 192 assumes the position shown dotted in Fig. 15, thereby completing a circuit through the high speed light to indicate to the operator that the transmission is conditioned for direct drive. With ground removed from the ignition break relay coil 212, the subsequent operation of throttle switch 187 to one-half throttle position to operate switches 215 and 219 has no effect upon the ignition break relay although the delayed action relay will alternately operate and deenergize in accordance with the movement of the throttle switch to partially operated and released position. It is assumed in the condition shown in Fig. 15 that the throttle switch is not moved to its down shifting position, that is, to the extremely wide open position of the throttle.

Figure 16:
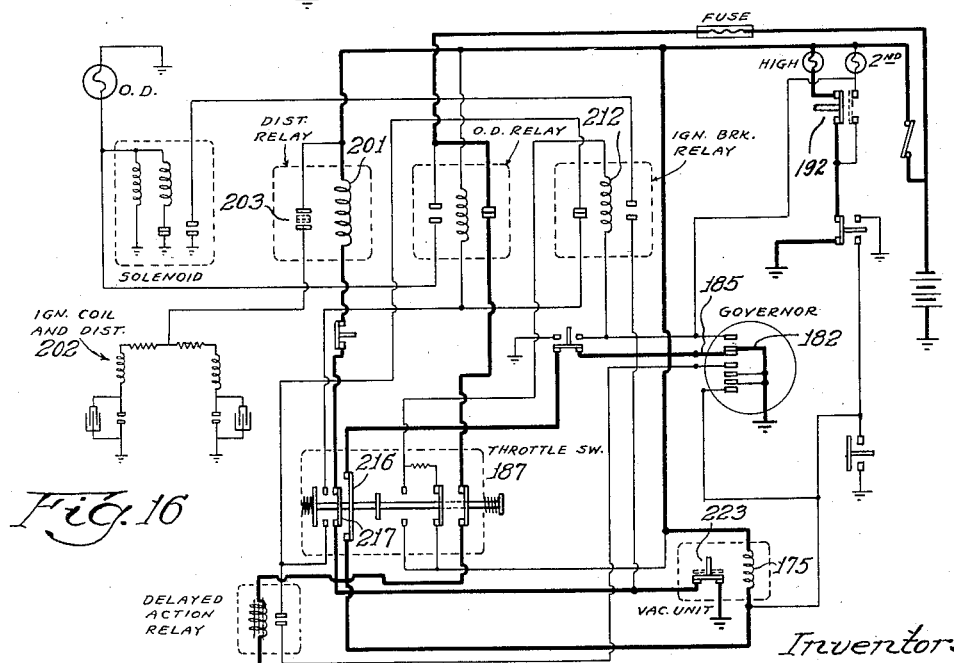

(3) *Vehicle moving between 12 m.p.h. and 23 m.p.h. with throttle switch in down shift position.*—The next condition is shown in Fig. 16 and illustrates the circuits established when throttle switch 187 is moved to its down shifting position while the car is moving at speeds ranging from 12 m.p.h. to 23 m.p.h. It will be remembered that the transmission is operating in direct drive and since none of the remaining speeds has been operated, the only down shift possible is to second speed. Accordingly, to effect the downshift it is necessary to restore ground to solenoid 175 of the vacuum unit to operate the vacuum valve 174 and latch 176 controlled thereby and thus permit spring 171 to push rod 170 and its cooperating lever 164 to release jaw clutch 74. The release of jaw clutch 74 cannot be accomplished under torque and hence the ignition circuit must likewise be opened to destroy driving torque. Referring now to Fig. 16 it will be observed that when throttle switch 187 is in downshift position, switches 216 and 217 are effective to complete their respective circuits, switch 216 restoring ground to solenoid 175 through contact 185 and arm 182 of the governor switch and switch 217 completing the circuit through distributor relay coil 201 subject however, to the operation of ignition break switch 223 associated with rod 170 of the vacuum unit. Because of a slight backlash provided between rod 170 and lever 164, the rod will move slightly upon the initial operation of solenoid 175 and this slight movement is sufficient to operate switch 223 to complete the circuit through distributor relay coil 201. The operation of the distributor relay opens contacts 203 of the distributor relay and breaks the circuit to the ignition system 202 with a resulting torque release on jaw clutch 74. The vacuum unit then completes the shift and in completing the shift again opens switch 223 which deenergizes distributor relay coil 201 and reestablishes the ignition circuit.

The shift from direct drive to second speed operated switch 192 associated with direct-second shift lever 164 to break the circuit through the direct speed indicator light and to reestablish the circuit through the second speed light and to put ground on coil 212 of ignition break relay as before.

The transmission will operate in second speed as long as the car is moved above 12 m.p.h. and upon a subsequent release of the throttle and the associated throttle switch 187, the latter will move away from its downshift position and will release switches 216 and 217 to break the circuits therethrough. This again removes ground from the vacuum unit solenoid 175 to cause the unit to shift lever 164 to direct drive position. Upon a release of torque sufficient to effect a movement of blocker 72 out of blocking position, direct drive will again be established.

(4) *Vehicle moving in direct above 23 m.p.h.*—The condition of the circuit which obtains when the vehicle is traveling above 23 m.p.h. is shown in Fig. 17. It is assumed that the transmission has been shifted to direct drive before a vehicle speed of 23 m.p.h. had been reached. The principal change effected at this critical speed is the automatic completion of a circuit through governor switch arm 181 and its associated contact 184. It will be assumed in connection with Fig. 17 that the throttle switch is not operated to its downshifting position. Initially, however, switch 206 of throttle switch 187 had been operated to complete a circuit as before through the overdrive relay contacts 205 to operate the delayed action relay and open contacts 230. Thus when the governor switch operated to complete the circuit therethrough as aforesaid, the remainder of the circuit remained open because of the opening of contacts 230. With a subsequent release of the throttle to the dotted position shown, delayed action relay 207 is deenergized and after a predetermined time delay, contacts 230 are closed. This establishes a circuit through two paths to overdrive relay coil 200 to operate the overdrive relay. One of the paths is through switch 221 directly to the coil 200 and the other path is around switch 221, through contacts 213 of the ignition break relay to coil 200. The energization of overdrive relay coil 200 closed contacts 211 and thereby completed the circuit through solenoid 96 of the overdrive control system to push the pawl 64 into engagement with slotted element 63. This stopped the rotation of sun gear 59 and established overdrive. The movement of pawl 64 into engagement with a slot 93 simultaneously opened contacts 209 to deenergize solenoid 96, and closed contacts 210 to condition the circuit for a subsequent down shift. The pawl is held in engaged position by holding coil 208.

It will be observed that the circuit through the overdrive relay coil 200 was not established until the throttle had been released. Simultaneously with the release of the throttle, intermediate shaft 27 was slowed down and was permitted, by delayed action relay 207, to continue slowing down for the period provided for by the delay in closing contacts 230. The movement of the pawl into engagement with a slot 93 therefore occurred when slotted element 63 was rotating slowly and was possible without further delay when the overdrive relay was energized.

The energization of overdrive relay coil 200 and the closing of its contacts 211 also completed a circuit through overdrive indicator lamp 226, and since direct drive lamp 225 had already been turned on, the operator was then apprised of the fact that the transmission was conditioned for overdrive direct operation. The throttle may thereafter be operated in the normal manner without effecting any change in the transmisison so long as the down shift position is not reached.

(5) *Vehicle moving between 23 and 35 m.p.h. in high overdrive with the throttle in one-half throttle position.*— It is contemplated that this invention will be used with a transmission wherein two successive down shifts are possible in a speed range of approximately 23 m.p.h. to 35 m.p.h. Fig. 18 shows the condition of the circuit when the vehicle is moving within this range in overdrive direct and the throttle has been moved to one-half throttle position before the first down shift. It will be observed that under these conditions the completion of the circuit through switch 215 has no effect upon the circuit or the operation of the transmission due to the fact that direct-second switch 192 removes ground from ignition break relay coil 212 when the first unit 25 of the transmission is in direct drive.

Figure 19:
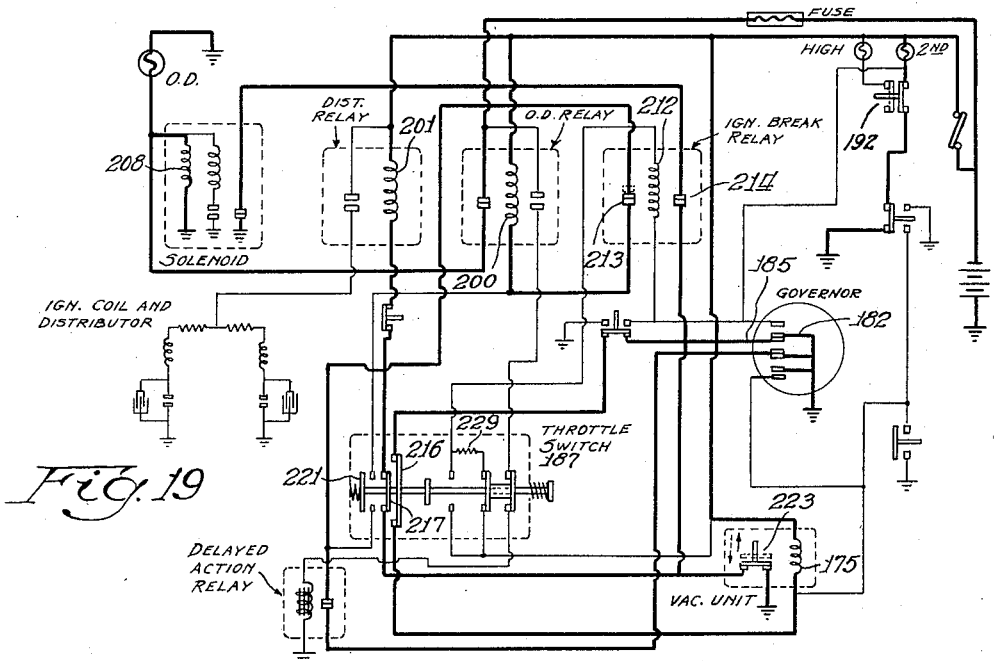

(6) *Vehicle moving between 23 and 35 m.p.h. in overdrive direct with throttle in first down-shift position.*— Fig. 19 shows the condition of the circuit when the throttle switch 187 has been moved to its down shifting position for the first time after the transmission has been shifted to overdrive direct. In this position the circuit through switches 216 and 217 are completed and the circuit through switch 221 is broken. It will be recalled that switch 221 provided one of two paths to overdrive relay coil 200 and that a second circuit was provided for this coil around switch 221 through contacts 213 of ignition break relay coil 212. The breaking of the circuit through switch 221 therefore has no effect on the overdrive relay and the latter remains energized through contacts 213 of the ignition break relay. No change is therefore effected in holding coil 208 of the overdrive solenoid and pawl 64 remains engaged with its slotted member 63 for overdrive operation. The ignition break relay coil 212 remains deenergized as long as direct-second switch 192 remains in the left hand position (Fig. 19).

The completion of the circuit through switch 216 establishes a ground connection for vacuum unit solenoid 175 through contact 185 and switch arm 182 of the governor switch. The completion of the circuit through switch 217 again completes the circuit through distributor relay coil 201 subject to the operation of ignition break switch 223 associated with the vacuum unit. Jaw clutch 74 will therefore be moved to disengage direct drive and permit second speed to become effective as shown in Fig. 16.

(7) *Vehicle moving between 23 and 35 m.p.h. in overdrive second after first down shift.*—It will be noted that when the vacuum unit has down shifted clutch 74, direct-second switch 192 is moved to its second speed position which extinguishes the direct drive light and reoperates the second speed light. It also establishes a ground circuit to ignition break relay coil 212.

Figure 20:
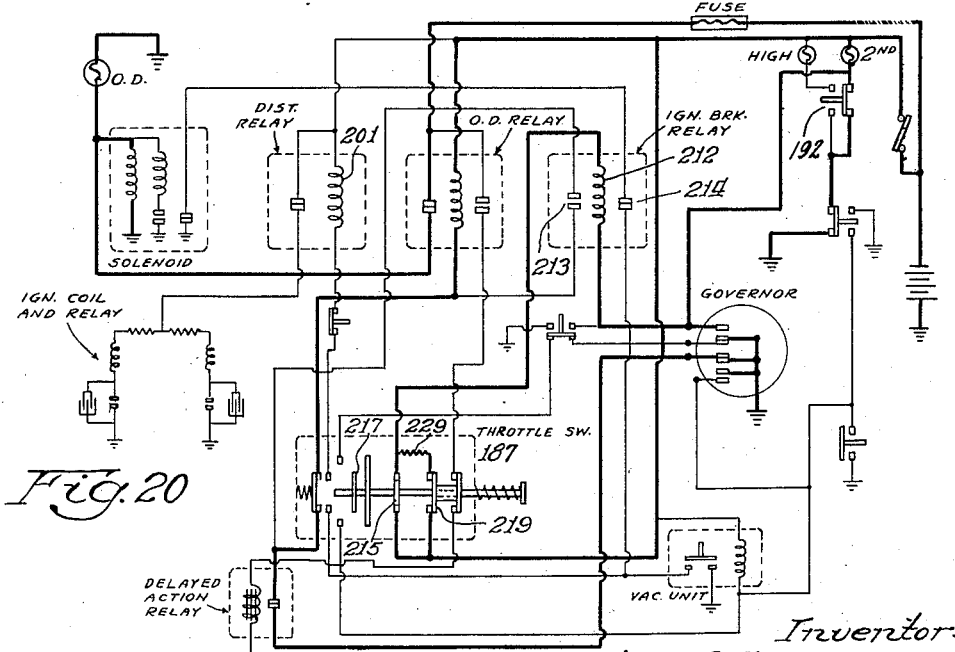

Referring now to Fig. 20, wherein throttle switch 187 is shown in its mid-position after the first down shift, it will be observed that switch 215 is operated to complete a circuit therethrough and that switch 219 had been previously operated when the throttle was moved to partially open position. The circuit through switch 215 applies battery to ignition break relay coil 212 and operates the relay to open contacts 213 and close contacts 214. This breaks the second circuit which had been provided for overdrive relay coil 200 and completes, through contacts

214, a circuit through distributor relay 201 subject, however, to the operation of switch 217. The circuit is now conditioned for a second down shift and although switch 215 may thereafter move to break the circuit therethrough, ignition break relay coil 212 will nevertheless remain energized through resistance 229 and switch 219 which remains operated at all times except when the throttle is in closed position.

Figure 21:
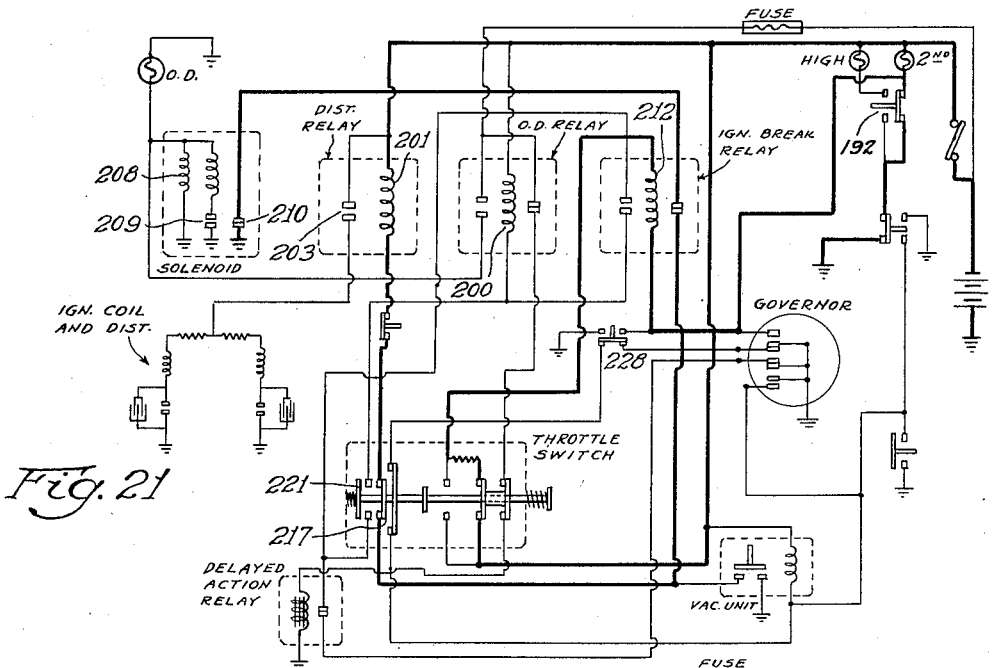

(8) *Vehicle moving between 23 m.p.h. and 35 m.p.h. in overdrive second after first down shift and circuit conditioned for second down shift.*—The condition of the circuit when the throttle switch 187 is moved to its down shifting position a second time after having been moved to one-half throttle position is illustrated in Fig. 21. The first operation effected is the opening of switch 221 which opens the only remaining circuit to overdrive relay coil 200 and therefore deenergizes the relay. This likewise deenergizes holding coil 208 of the solenoid and permits spring 95 to bias the pawl 64 to disengaged position. The pawl will not move, however, until there is an interruption of torque. The interruption is accomplished by the immediately following completion of the circuit through switch 217 to distributor relay coil 201 which then becomes energized and opens contacts 203, thereby opening the ignition circuit. The movement of pawl 64 radially outward to disengaged position closes contacts 209 and opens contacts 210 to deenergize distributor relay coil 201, thereby reestablishing the ignition circuit and permitting forward movement of the vehicle in second speed.

(9) *Vehicle moving above 35 m.p.h.*—Above 35 m.p.h. a down shift into overdrive second would merely cause the engine to rotate at an excessive speed without materially increasing the torque and speed of the vehicle. It is desirable therefore above this speed to prevent a down shift into overdrive second or into second. This is accomplished as shown in Fig. 22.

Figure 22:
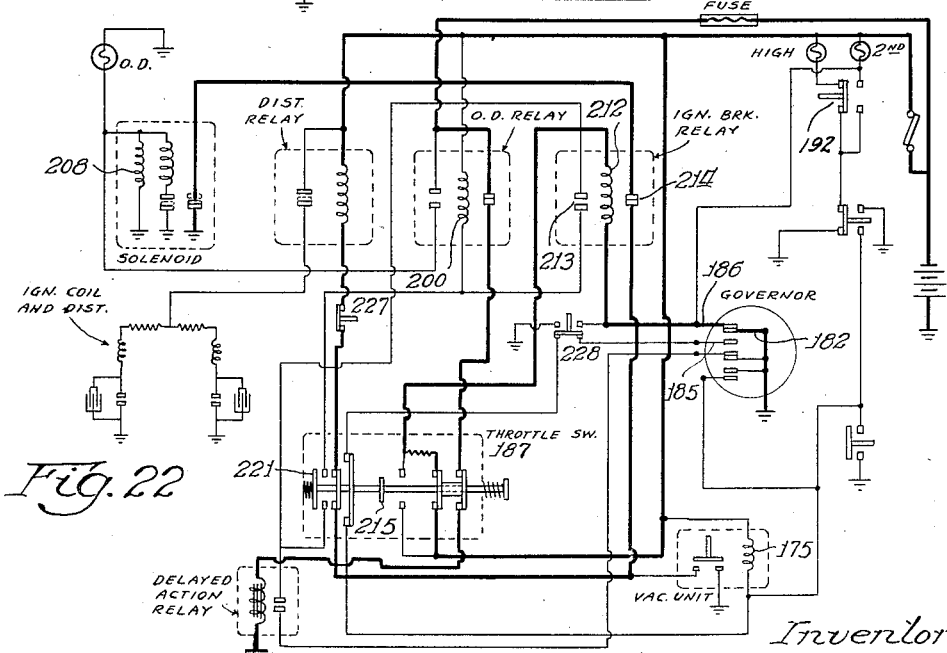

In Fig. 22 the circuit is shown with throttle switch 187 in its down shifting position and the vehicle moving above 35 m.p.h. in overdrive direct. It will be remembered that a down shift into direct drive was rendered impossible in Fig. 21 because direct-second switch 192 had been moved to remove ground from ignition break relay coil 212 and that ground was not established until the vacuum unit had operated clutch 74 to provide second speed. It will also be remembered that a down shift through the vacuum unit was made possible by the completion of a circuit through contact 185 and switch arm 182 of the governor switch. Accordingly, above 35 m.p.h. the governor switch is so arranged that switch arm 182 breaks the connection with contact 185 and establishes a circuit through contact 186, the change being effected substantially instantaneously. This provides the ground for coil 212 which had been removed by switch 192, and it removes the ground which was required for the operation of vacuum unit solenoid 175. The positioning of throttle switch 187 to its down shift position under these conditions therefore releases overdrive relay coil 200 through the switch 221 as before to deenergize holding coil 208 and thereby to permit pawl 64 to move outwardly to release sun gear 59.

It is assumed in Fig. 22 that throttle switch 187 will have been moved at one time or another during the normal operation of the vehicle to one-half throttle position wherein switch 215 completes the circuit through ignition break relay coil 212 to close its contacts 214 and open contacts 213 controlling one of the circuits to overdrive relay coil 200.

Icy weather controls

It will be recalled that a feature of this invention is a control which prevents a down shift into direct drive from overdrive direct, or a down shift into overdrive second or second from overdrive direct, the purpose of this control being to prevent the operator from spinning the rear wheels of the vehicle such as would result under icy weather conditions if a down shift into a higher torque ratio were permitted.

To prevent a down shift into second or overdrive second, switch 228 is employed, this switch being so connected as to perform the same function as switch arm 182 of the governor switch. Thus if switch 228 is in the position shown in Fig. 22 a down shift out of direct drive will be possible as before. If, however, the switch is operated to break the lower contacts and make the upper contacts, it will then provide a ground for ignition break relay coil 212 which is independent of direct-second switch 192, thereby simultaneously making impossible a down shift out of direct drive and making possible a down shift from overdrive to direct. If it is desired to prevent a down shift from overdrive direct to direct drive, a second switch 227 may be employed which normally makes a series connection between throttle switch 187 and the distributor relay coil 201. To prevent a down shift, switch 227 is operated to open the circuit to coil 201, thereby preventing an ignition interruption such as is required to relieve the pawl 64 of torque to permit it to be withdrawn from slotted element 63 by its spring 95.

It is contemplated that switches 227 and 228 will be located within reach of the operator and that they may be operated from a single mechanism.

Operation

The operation of the individual units of the transmission has been described elsewhere both as to their mechanical shifts and the controls for effecting the shifts. There remains to be described the joint operation of the units under specific conditions.

The transmission provides five speeds forward, neutral and reverse. Hydraulic coupling 31 permits automatic starts in any of the speeds. Disconnectible clutch 30 permits shifts to be made between neutral, reverse, first and second speeds. The speeds above second speed are automatic and are controlled jointly by a speed controlled switch and by the operator, both as to up shifts and down shifts. An important feature of this invention is the provision of means for simultaneously conditioning the transmission for operation in two speeds, with other means under the control of the operator for selecting which speed shall become effective. Specifically, the shift means for the overdrive is made to take place independently of a torque reversal so as to render it extremely rapid in operation, and the shift to direct is made dependent upon torque reversal so as to make it relatively slower to operate. In a model which has been built and operated it has been found that the overdrive may be shifted almost instantly, but to promote smoothness a delay of 9/10 of a second was found desirable. The countershaft transmission requires one and one-half seconds for its operation.

Referring to Fig. 13, it will be apparent that it is possible to operate the vehicle in second speed at speeds above the direct drive cut in speed (12 m.p.h.) and above the cut-in speed of the overdrive (23 m.p.h.). When operating in second speed above 23 m.p.h. the circuit is conditioned to effect both a shift into direct and into overdrive. Because of the ratios available, it is desirable to enable the operator to select overdrive second speed or overdrive direct speed at his option so that he may have at his disposal whichever speed is best suited for the conditions existing at the moment. For this reason a different time interval between the operation of the second-direct clutch 74 and overdrive pawl 64 has been designed into the transmission. Thus while operating in second speed in the range between 23 m.p.h. and 35 m.p.h. the operator may select either overdrive second speed or overdrive direct speed depending upon how long the throttle is held in a released or closed position. If the time interval is less than 1½ seconds and the throttle is immediately opened so as to transmit torque again through the transmission, the overdrive will become effective and the blocker 72 will prevent direct drive from becoming effective as long as torque is applied. If, however, the throttle is held released for a period of 1½ seconds or more, overdrive direct will become effective. When in overdrive second above 23 m.p.h., overdrive direct may be had by again releasing the throttle and holding it released for a period of 1½ seconds or longer.

It is to be understood that the foregoing description is merely illustrative of a preferred embodiment of the invention and that the scope of the invention is not to be limited thereto but is to be determined by the appended claims.

We claim:

1. A variable speed transmission comprising in combination a countershaft type unit having low, second and direct drive ratios, and a planetary type unit having direct drive and overdrive ratios, means for effecting shifts between second and direct drive in the countershaft unit, means for effecting shifts between direct drive and overdrive in the planetary unit, and means for automatically controlling the two said shifting means to effect shifts from second to direct to overdrive direct, or alternatively from second to second overdrive to overdrive direct.

2. A variable speed transmission as described in claim 1, and means under the control of the operator for effecting the alternative sequence of shifts.

3. A variable speed transmission comprising in combination a countershaft type unit having low, second and direct drive ratios, and a planetary type unit having direct drive and overdrive ratios, means for effecting shifts between second and direct drive in the countershaft unit, means for effecting shifts between direct drive and overdrive in the planetary unit, and means for automatically controlling the two said shifting means to effect upshifts from second to overdrive second to overdrive direct and downshifts from overdrive direct to overdrive second to second.

4. A variable speed transmission as described in claim 3, said automatic controlling means being adapted alternatively to upshift from second to direct to overdrive direct at the option of the operator.

5. A transmission comprising input and output shafts, a plurality of means for establishing different ratios between the shafts, and means for simultaneously conditioning at least two of said first means for operation, said two means being different, one of said two means being inherently faster in operation than the other, whereby to enable the operator selectively to control the ratio establishing means.

6. A transmission comprising input and output shafts, a plurality of gear trains connectible between the shafts to provide a first speed forward, and a second, a third and a fourth speed forward for rotating the output shaft at successively higher rates, means controlled jointly by the speed of a member associated with the transmission and by the operator for effecting upward shifts between the speeds, said means during upward shifts normally omitting one of the speeds, and manually controlled means cooperable with the speed control for effecting by successive substantially identical movements of the manually controlled means a down shift from the fourth of said speeds to the third, and from the third of said speeds to the first.

7. A transmission comprising input and output shafts, a plurality of gear trains connectible between the shafts to provide at least four speeds forward, means controlled jointly by the speed of a member associated with the transmission and by the operator for effecting upward shifts between the speeds increasing the speed of the output shaft relative to the input shaft, and manually controlled means cooperable with the speed control for effecting a plurality of downshifts between the speeds decreasing the speed of the output shaft relative to the input shaft by successive substantially identical movements of the manually controlled means, said upward shifts and down shifts within a predetermined range of speeds of the speed controlled member being normally set to skip one of the speeds.

8. A variable speed transmission comprising input and output shafts, variable speed gearing interconnecting said shafts to produce a plurality of speed ratios through the transmission, means for effecting shifts from one ratio to another, automatically operated means for controlling the shift means, a power control lever, manually operated means for overruling the automatic means to effect a down shift, said manually operated means being operated in conjunction with the operation of the power control lever and at substantially wide open position thereof, and other manually operated means for overruling the first manually operated means to prevent a down shift through the transmission except as called for by the automatic means.

9. A variable speed transmission comprising input and output shafts, variable speed gearing interconnecting said shafts to produce a plurality of speed ratios means for effecting shifts from one speed to another, a pair of automatically operated means for controlling the shift means, a power control lever, manually operated means for overruling both of said automatically operated means to effect down shifts, said manually operated means being operated in conjunction with the operation of the power control lever and at substantially wide open position thereof, and other manually operable means for overruling one of the manually operated means to prevent a down shift through the transmission except as called for by the automatic means.

10. A variable speed transmission comprising two variable speed units in tandem, said units being adapted to provide second, overdrive second, direct and overdrive direct ratios through the transmission, automatically controlled means for establishing said ratios, a throttle, means controlled by the throttle for overruling the automatically controlled means to effect a down shift from overdrive direct to overdrive second, and manually controlled means for overruling the throttle controlled means to prevent a down shift from overdrive direct to overdrive second.

11. A variable speed transmission comprising two variable speed units in tandem, said units being adapted to produce a plurality of speed ratios through the transmission, means for effecting shifts from one ratio to another, a source of electrical energy, electromagnetic means for controlling the shift means, a speed controlled switch for establishing circuits from the source of energy to the electromagnetic means, a power control lever, switch means operated by the power control lever and adapted to cause a change in the circuits through the electromagnetic means to effect a downshift, and manually controlled switch means adapted to nullify the effect of the power control lever switch, thereby preventing a downshift except as called for by the speed controlled switch.

12. A transmission comprising input and output shafts, an intermediate shaft, a countershaft type of gear train connectible between the input shaft and the intermediate shaft, said gear train including an overrunning clutch, a jaw clutch for connecting the input shaft to the intermediate shaft, an overrunning clutch connecting the intermediate shaft to the output shaft, a planetary gear train connecting said shafts around the last mentioned overrunning clutch, said planetary gear train including a slotted reaction member, a non-rotatable pawl engageable with the slotted member to provide a fixed reaction for the planetary gear train, means for simultaneously conditioning the jaw clutch and the pawl for operation to establish different ratios through the transmission, and a blocker ring on the jaw clutch for rendering the clutch inherently slower to operate than the pawl, thereby enabling the operator selectively to control the establishing of the gear trains, the overrunning clutches serving to disconnect the intermediate shaft from the other shafts to enable the pawl to engage the slotted member quickly substantially without shock.

13. In a transmission device having input and output shafts, variable speed gearing for connecting said shafts in different ratios, and a pair of movable elements for controlling the ratios, a control system for the transmission comprising a source of electrical energy, electromagnetic means associated with the movable elements to control the movement of said elements, speed controlled means for controlling the circuit through the electromagnetic means, said speed controlled means being adapted to condition the electromagnetic means for simultaneous operation of the movable elements, and means rendering one of the movable elements inherently slower to operate than the other and inoperable within a predetermined length of time, thereby enabling the operator selectively to control the speed ratios.

14. A control system in a transmission as described in claim 13, said last mentioned means rendering the movable element associated therewith inoperative to effect a movement while forward driving torque is impressed thereon.

15. A transmission comprising input and output shafts, a plurality of gear trains connectible between the shafts to provide four speeds forward, automatically controlled means for effecting upward shifts between the speeds, and manually controlled means for effecting downshifts by successive substantially identical movements of the manually controlled means, said manually controlled means being normally set to skip one of the speeds in effecting said downshifts.

16. A transmission comprising input and output shafts, a plurality of gear trains connectible between the shafts to provide four speeds forward, automatically controlled means for effecting upward shifts between the speeds and skipping one of the speeds, and manually controlled means for effecting downshifts by successive substantially identical movements of the manually controlled means, said manually controlled means being normally set to skip one of the speeds in effecting said downshifts.

17. A variable speed transmission comprising input and output shafts, a plurality of gear trains connectible between the shafts to provide three speeds forward, a throttle, means under the control of said throttle for normally effecting a shift from the highest of said speeds to a first one of the lower speeds on an operative stroke of the throttle, and manually operated means for controlling said shifting means whereby after operation of the manually operated means the shifting means on a similar operative stroke of said throttle effects a shift from the highest of said speeds to the second one of the lower speeds instead of the first one of the lower speeds.

18. A variable speed transmission comprising input and output shafts, a plurality of gear trains connectible between the shafts to provide four speeds forward, automatically operating means for effecting a shift from the lowest to the highest of said speeds, a throttle, means under the control of said throttle for normally effecting a shift from the highest of said speeds to one of said intermediate speeds, and manually operated means for controlling said throttle controlled means whereby after operation of the manually operated means the throttle controlled means effects a shift from the highest of said speeds to the other of said intermediate speeds instead of said first-named intermediate speed.

19. A variable speed transmission comprising input and output shafts, a plurality of gear trains connectible between the shafts to provide three speeds forward, means for effecting shifts from one ratio to another, a source of electrical energy, electromagnetic means connected by electrical circuits with said electrical energy source for controlling said shift means, a power control lever, switch means operated by said power control lever and adapted to cause a change in said electrical circuits to effect a downshift from the highest speed to a first one of the lower speeds, and manually operated switch means adapted to cause a change in said circuits whereby after said last-named switch means is operated, operation of said first-named switch means effects a downshift to the second one of the lower speeds instead of the first one of the lower speeds.

20. A variable speed transmission comprising a countershaft type unit and a planetary type unit in tandem, each of said units providing two ratios, means for effecting shifts from one ratio to another in the countershaft type unit, means for effecting shifts from one ratio to another in the planetary unit, the ratios of said units being combinable to produce four different transmission speeds, and means for automatically operating the two said shifting means to effect shifts from the lowest speed to the highest speed through alternatively either of the intermediate speeds.

21. A variable speed transmission comprising a countershaft type unit and a planetary type unit in tandem, each of said units providing a first and a second ratio, means for effecting shifts from one ratio to another in the counter shaft type unit, means for effecting shifts from one ratio to another in the planetary unit, said first ratios of said units being combinable to produce a low transmission speed, said first ratio of the countershaft unit being combinable with said second ratio of the planetary unit to produce an intermediate transmission speed, said second ratio of the countershaft unit being combinable with said first ratio of the planetary unit to produce a higher intermediate transmission speed, said second ratios of the two units being combinable to produce a high transmission speed, and means for automatically operating the two said shifting means to effect shifts from the low speed to the high speed through alternatively either of the intermediate speeds.

22. A variable transmission as described in claim 21, and governor means for controlling the operating means for the units.

23. A variable speed transmission comprising in combination a countershaft type unit having low, second and direct drive ratios, and a planetary type unit having direct drive and overdrive ratios, means for effecting shifts between second and direct drive in the countershaft unit, means for effecting shifts between direct drive and overdrive in the planetary unit, and means for automatically controlling the two said shifting means to effect shifts from second to direct to overdrive direct, or alternatively from second to second overdrive to overdrive direct.

24. A variable speed transmission as described in claim 23, and means under the control of the operator for effecting the alternative sequence of shifts.

References Cited in the file of this patent

UNITED STATES PATENTS

| | | |
|---|---|---|
| 2,156,336 | Haigh | May 2, 1939 |
| 2,159,442 | Maurer | May 23, 1939 |
| 2,185,730 | Griswold | Jan. 2, 1940 |
| 2,231,876 | Beltz | Feb. 18, 1941 |
| 2,236,657 | Webb | Apr. 1, 1941 |
| 2,241,002 | Peterson | May 6, 1941 |
| 2,241,632 | Claytor | May 13, 1941 |
| 2,243,111 | McFarland | May 27, 1941 |
| 2,259,732 | Burtnett | Oct. 21, 1941 |
| 2,259,733 | Burtnett | Oct. 21, 1941 |
| 2,262,747 | Banker | Nov. 18, 1941 |